(12) United States Patent
Nakada

(10) Patent No.: US 6,751,465 B2
(45) Date of Patent: Jun. 15, 2004

(54) RADIO COMMUNICATION PERMISSION CONTROL SYSTEM

(75) Inventor: Suguru Nakada, Tokyo (JP)

(73) Assignee: NEC Corporation, Tokyo (JP)

( * ) Notice: Subject to any disclaimer, the term of this patent is extended or adjusted under 35 U.S.C. 154(b) by 547 days.

(21) Appl. No.: 09/878,233

(22) Filed: Jun. 12, 2001

(65) Prior Publication Data

US 2001/0053697 A1 Dec. 20, 2001

(30) Foreign Application Priority Data

Jun. 16, 2000 (JP) ........................................ 2000/180687

(51) Int. Cl.[7] ................................................ H04B 7/00
(52) U.S. Cl. ..................... 455/512; 455/456.1; 455/450; 455/452; 455/509; 370/335; 370/230
(58) Field of Search ........................ 455/456.1, 456 H, 455/450, 452.1, 509, 512; 370/335, 230

(56) References Cited

U.S. PATENT DOCUMENTS

| | | | |
|---|---|---|---|
| 6,061,553 A | * | 5/2000 | Matsuoka et al. ........... 455/273 |
| 6,188,913 B1 | | 2/2001 | Fukagawa et al. .......... 455/562 |
| 6,385,458 B1 | * | 5/2002 | Papadimitriou et al. . 455/456.2 |

FOREIGN PATENT DOCUMENTS

| | | |
|---|---|---|
| JP | 9-247005 | 9/1997 |
| JP | 10-70502 | 3/1998 |
| JP | 11-215049 | 8/1999 |
| JP | 2000-31896 | 1/2000 |
| JP | 2000-32530 | 1/2000 |
| WO | WO 00/11879 | 3/2000 |

* cited by examiner

*Primary Examiner*—Vivian Chin
*Assistant Examiner*—Minh Dao
(74) *Attorney, Agent, or Firm*—Foley & Lardner LLP

(57) ABSTRACT

A radio communication permission control apparatus includes a request receiving section, a reply section, an estimating section, a storage section, a determining section and a priority section. The request receiving section receives communication start request signals from requesting communication terminals. The reply section replies to each of the requesting communication terminal based on priority levels of the requesting communication terminals, a response indicating whether or not to permit communication start every time the request receiving section receives each of the communication start request signals. The priority section increases the priority levels for the prohibited communication terminals.

20 Claims, 9 Drawing Sheets

RADIO COMMUNICATION PERMISSION CONTROL SYSTEM

BACKGROUND OF THE INVENTION

1. Field of the Invention

The present invention relates to a radio communication permission control system which carries out an access permission control when one of communication terminals such as portable phones accesses a reception apparatus such as a base station for communication start.

2. Description of the Related Art

A communication apparatus using a mobile communication terminal such as a portable phone becomes popular rapidly. Especially, attention is recently paid to the communication :apparatus of the CDMA (code division multiple access) communication system which is difficult to undergo influence of noise and interference from other signals by using the spectrum spreading technique. The mobile terminal such as a portable phone adopts a cell system to attempt the effective use of a frequency band, and a channel is allocated to the mobile terminal in each cell.

By the way, the number of channels possible to be allocated in one cell, that is, the number of communicable mobile terminals which can communicate and call at a time is finite. Therefore, as a typical example, the number of mobile terminals which request communication at a time in one cell exceeds the permissible number of communication terminals in some probability. In such a case, the phenomena will occur in which it is not possible to connect with a base station regardless of requests of communication.

Figure 1A:
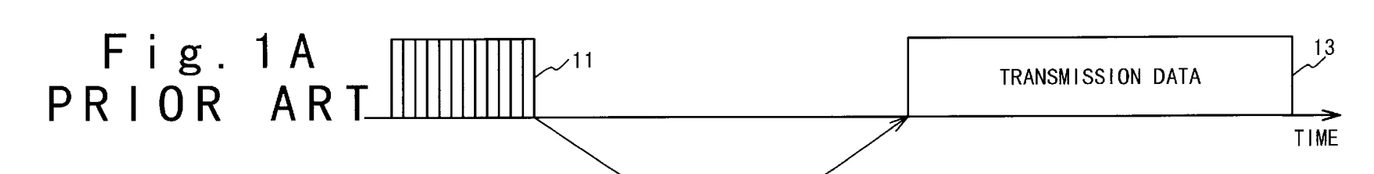
FIGS. 1A and 1B are timing charts showing the transmission and reception states of signals between a mobile terminal and a base station in a random access channel system.
Figure 1B:
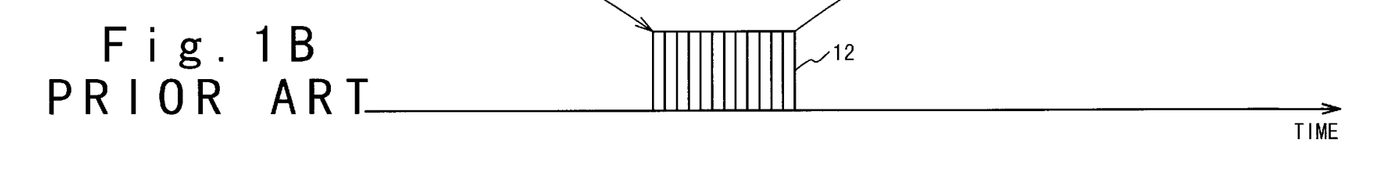

FIGS. 1A and 1B show a random access channel (RACH) system for the channel acquisition and it is used in a part of the communication terminals of the CDMA communication system. In the system shown in these figures, a random access channel system is used for an upward link channel from the mobile terminal to the base station. The communication terminal (not shown) requesting the communication outputs a preamble signal 11 composed of a predetermined code sequence as shown in FIG. 1A at the time when trying to start communication. When receiving the preamble signal 11, the base station (not shown) replies an ACK (affirmative) signal 12 to the mobile terminal as shown in FIG. 1B, when permitting the communication. The base station replies a NACK (negative) signal when the base station does not permit the communication, although it is not illustrated. The mobile terminal receives the ACK signal 12 and start the communication and outputs a message section 13 having transmission data as the content as shown in FIG. 1A.

In this way, in the random access channel system, the preamble signal 11 is used as a signal requesting message section 13. In other words, the message section 13 itself is common to all the mobile terminals, and the signal used for each mobile terminal to request a use right of the message section 13 to the base station is the preamble signal 11.

The number of message sections 13 which the base station can allocate in one cell is finite. Therefore, as described above, a specific mobile terminal transmits the preamble signal 11 once again, if still requesting the communication when the specific mobile terminal has transmitted the preamble signals 11 but is not permitted to communicate for the reply of the NACK signal. In such a case, when the communication chances are equally allocated to the mobile terminals which have sent out the preamble signals 11, the specific mobile terminal is occasionally not given a chance each time. Such a specific mobile terminal must wait for the communication permission for a long time.

For this reason, a proposal is made to eliminate such inequality. For example, in Japanese Laid Open Patent Application (JP-A-2000-32530), a mobile station in a distant place is given an opportunity to transmit under the situation in which the mobile stations in the neighborhood of a base station continuously tries to transmit signals. In this proposal, the mobile terminal on the position where the electric wave is relatively weak can be protected. However, the communication opportunity cannot be given in a higher priority to the mobile terminal in which access is refused regardless of the near and far positions when the accesses compete.

Also, in another proposal, data for specifying the mobile terminal in which a communication request is refused is stored in the base station. When the mobile terminal transmits the preamble signal 11 in the next opportunity, the message section 13 is allocated in,a higher priority to the mobile terminal corresponding to the stored data under the situation where accesses from mobile terminals compete. To realize such a proposal, what data should be stored in the base station is important as the data for specifying the mobile terminal.

As the simplest technique, it will be considered that a unique preamble signal 11 is allocated to every mobile terminal and a code sequence of the preamble signal is stored in the base station as the data for specifying a mobile terminal. For this purpose, it is presupposition that different preamble signals 11 are allocated to the respective mobile terminals separately, as in the phone number. However, such a technique cannot be adopted for all mobile terminals in the communications system. For example, in the communications system which is planed to introduce in every country of the world since 2001, and is called W-CDMA (Wideband Code Division Multiple Access) system, a random access channel system is adopted in the same way. However, the number of kinds of the preamble signal 11 prepared in a same cell (area) is a ten and a few. Therefore, when the mobile terminals more than the number of kinds exist in the same area, the mobile terminal which has transmitted preamble signal 11 cannot be specified by this preamble signal 11.

In conjunction with the above description, an adaptive array receiving apparatuses disclosed in Japanese Laid Open Patent application (JP-A-Heisei 9-247005). In this reference of the adaptive array receiving apparatus, an adaptive control is turned off for a preamble section (t2) of a reception signal and turned on for a data section (t3). In order to obtain a sufficient converging time, the reception data are read out twice and the converging operation is carried out for the reading operation. The number of time of repetition of the reading operation is predetermined based on adopted data format length of the system. In this way, an adaptive signal processing section (7) extracts only a signal transmitted, :from a specific terminal from among reception signals when the reception signals compete.

Also, a directional control antenna apparatus is disclosed in Japanese Laid Open Patent application (JP-A-Heisei 10-70502). In this reference, the directionality control antenna apparatus has an array antenna which transmits and receives electric wave to a mobile station in its area for a base station. A frequency convert section converts a reception signal of the array antenna into an intermediate frequency signal or a baseband frequency signal and converts a transmission signal of the intermediate frequency signal or the baseband frequency into a transmission frequency signal. The incoming direction estimating section estimates the incoming direction of the electric wave from the mobile station using the output signal from the frequency converting section and estimates the number of stations existing in the area in the direction of the mobile station. The antenna directionality control unit changes the phase and amplitude of the transmission signal or the reception signal and turns the direction of the peak of the directional beam of the array antenna to the direction of the mobile station estimated by the incoming angle estimating section. The reception from the mobile station and the transmission to the mobile station are carried out in a time divisional manner by use of the same directional beams formed by the antenna directionality control unit.

Also, a directional control antenna apparatus is disclosed in Japanese Laid Open Patent application (JP-A-Heisei 11-215049). In this reference, a mobile station has a communication signal transmitting section which transmits a communication signal, and a control signal transmitting section which transmits a control signal in a relatively low rate the communication signal. The base station has an array device using an antenna which has a wide directional pattern. In the directional control antenna apparatus, one or more array antennas carry out transmission/reception with one or more mobile stations existing around the mobile station. The frequency converting section converts a reception signal from the array device into an intermediate frequency signal or a baseband frequency signal in case of the reception. In transmission, it converts the intermediate frequency signal or the baseband frequency signal for the transmission into a transmission frequency signal. The bandpass filter for the control signal passes through only a signal of the frequency band of the control signal from the output signal from the frequency converting section. The incoming direction estimating section estimates the number of stations and the direction where the mobile station exists from the output of the band-pass filter for the control signal. The antenna directionality control unit changes the phase and amplitude of the intermediate frequency signal or the baseband frequency signal of the reception and the transmission and forms a sharp directional beam of the array antenna such that the directional gain higher than the directional pattern of the array device is obtained. The antenna directionality control unit turns the directional beam direction of the peak to the direction of the mobile station estimated by the incoming direction estimating section. Thus, communication with the mobile station is carried out by the same directional beam set by the antenna directional control unit in the transmission and the reception.

Also, a direction determining method in a cellar mobile communication network is disclosed in Japanese Laid Open Patent Application (P2000-31896A). In this reference, a sequence of symbols including a known training sequence from antenna array is stored. Space processing is repetitively carried out to the stored sequence of symbols for generating the influence of the antenna array having main lobe in a plurality of different and continuous directions of a polar diagram. A correlation measuring reference is calculated between a composite signal and known training sequence for every direction to determine a correlation measuring reference. A ratio of the correlation measuring reference for every direction to power of the composite signal is calculated to determine a direction measuring reference. Using the direction measuring reference, the direction of the mobile terminal is determined.

SUMMARY OF THE INVENTION

Therefore, an object of the present invention is to provide a radio communication permission control system in which a mobile terminal can be specified and can start communication with a priority, if the mobile terminal transmits a communication start request once again when the communication start request has been transmitted but the request is not permitted.

In an aspect of the present invention, a radio communication permission control apparatus includes a request receiving section, a reply section, an estimating section, a storage section, a determining section and a priority section. The request receiving section receives communication start request signals from requesting communication terminals. The reply section replies to each of the requesting communication terminal based on priority levels of the requesting communication terminals, a response indicating whether or not to permit communication start every time the request receiving section receives each of the communication start request signals. The estimating section analyzes the communication start request signal and estimates a position relation with the requesting communication terminal to generate position relation data. The storage section stores the position relation data. The determining section determines whether or not the position relation data of each of the requesting communication terminals to which the communication start are not permitted as prohibited communication terminals falls within a range which is predetermined based on each of the position relation data stored in the storage section, and stores the position relation data in the storage section. The priority section increases the priority levels for the prohibited communication terminals.

The position relation data may indicate a direction of each of the requesting communication terminals from the radio communication permission control apparatus. In this case, the determining section may determine whether or not a direction of the requesting communication terminal indicated by the estimated position relation data is in a predetermined directional range corresponding to any of the position relation data stored in the storage section.

Also, the position relation data may indicate an incoming angle of the communication start request signal transmitted from each of the requesting communication terminals to the radio communication permission control apparatus. In this case, the determining section may determine whether or not an incoming angle of the communication start request signal from the requesting communication terminal indicated by the estimated position relation data is in a predetermined angle range corresponding to any of the position relation data stored in the storage section.

Also, each of the requesting communication terminals may transmit position data of the requesting communication terminal together with the communication start request signal. In this case the estimating section may extract the position data as the position relation data. Also, the position relation data may be the position data indicating a position of each of the requesting communication terminals. In this case, the determining section may determine whether or not a position of the requesting communication terminal falls within a predetermined position range corresponding to any of the position relation data stored in the storage section.

Also, the position relation data may be held in the storage section for a predetermined time period.

Also, the predetermined time period may be a time period during which the requesting communication terminal is regarded not to move farther than a predetermined distance.

In another aspect of the present invention, a method of permitting communication in a radio communication permission control apparatus is attained by (a) receiving communication start request signals from requesting communication terminals; by (b) replying to each of the requesting communication terminal based on priority levels of the requesting communication terminals, a response indicating whether or not to permit communication start every time the reception of each of the communication start request signals; by (c) analyzing the communication start request signal and estimating a position relation with the requesting communication terminal to generate position relation data; by (d) determining whether or not the position relation data of each of the requesting communication terminals to which the communication start are not permitted as prohibited communication terminals falls within a range which is predetermined based on each of the position relation data stored in the storage section, and stores the position relation data in a storage section; and by (e) increases the priority levels for the prohibited communication terminals.

Here, the position relation data may indicate a direction of each of the requesting communication terminals from the radio communication permission control apparatus. In this case, in the (d) determining step, it may be determined whether or not a direction of the requesting communication terminal indicated by the estimated position relation data is in a predetermined directional range corresponding to any of the position relation data stored in the storage section.

Also, the position relation data may indicate an incoming angle of the communication start request signal transmitted from each of the requesting communication terminals to the radio communication permission control apparatus. In this case, in the (d) determining step, it may be determined whether or not an incoming angle of the communication start request signal from the requesting communication terminal indicated by the estimated position relation data is in a predetermined angle range corresponding to any of the position relation data stored in the storage section.

Also, each of the requesting communication terminals may transmit position data of the requesting communication terminal together with the communication start request signal. In this case, in the (c) estimating step, the position data as the position relation data may be extracted. Also, the position relation data may be the position data indicating a position of each of the requesting communication terminals. In this case, in the (d) determining step, it may be determined whether or not a position of the requesting communication terminal falls within a predetermined position range corresponding to any of the position relation data stored in the storage section.

Also, the position relation data may be held in the storage section for a predetermined time period.

Also, the predetermined time period may be a time period during which the requesting communication terminal is regarded not to move farther than a predetermined distance.

DESCRIPTION OF THE PREFERRED EMBODIMENTS

Hereinafter, a radio communication permission control system of the present invention will be described in detail with reference to the attached drawings.

Figure 2:
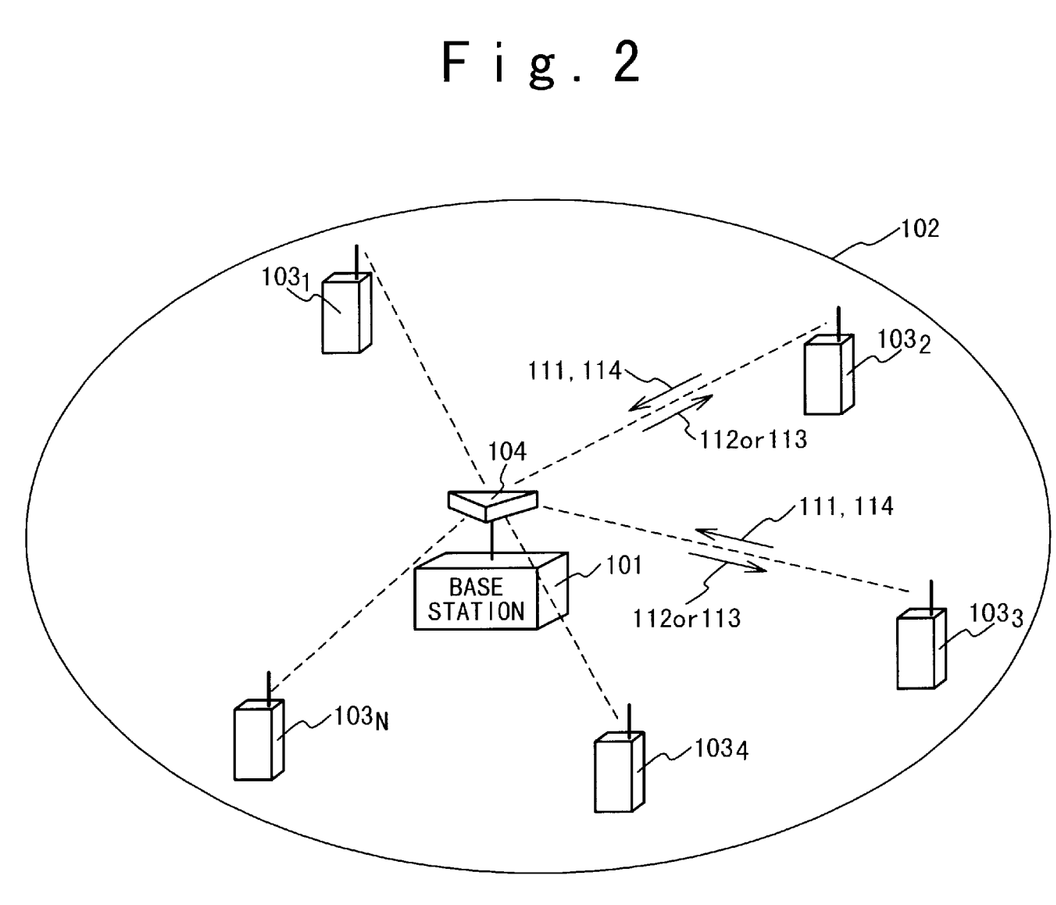
FIG. 2 is a block diagram showing the schematic structure of the arrangement relation of a base station and mobile terminals using radio communication permission control system according to an embodiment of the present invention.

FIG. 2 shows an example of the arrangement relation between a base station and mobile terminals which use the radio communication permission control system according to an embodiment of the present invention. The first to N-th mobile terminals 1031 to 103N exist in a service area 102 of the base station 101. Here, the numerical value N is an integer equal to or more than 2, and generally, it is the value which is much larger than 2. The base station 101 is composed of an adaptive array antenna 104. When the first to N-th mobile terminals 1031 to 103N transmit preamble signals 111 for communication start, the base station 101 can determine the directions of the mobile terminals. When the preamble signal 111 is transmitted from the mobile terminal 103, the base station 101 replies an ACK signal 112 when permitting communication and replies an NACK signal 113 when not permitting.

Here, the preamble signal 111 in this embodiment has the following features. ① Code sequences of preamble signals 111 are not allocated to the first to N-th mobile terminals 1031 to 103N in the service area 102 one by one as peculiar code sequences. The number of code sequences is predetermined for the mobile terminals 103 in this service area 102, and the mobile terminals 103 can use them in common. ② The specific preamble signal 111 allocated once to each mobile terminal 103 is not used continuously and different every time the transmission is carried out. Therefore, the base station 101 cannot determine from which of the mobile terminals 103 the preamble signal 111 has been transmitted, only by decoding the code sequence of the received preamble signal 111.

A message section 114 is allocated to the mobile terminal 103 which has received the ACK signal 112 and the transmission of the data becomes possible. The base station stores the direction θ of the mobile terminal 103 when the base station replies the NACK signal 113. Then, when the mobile terminal 103 transmits the preamble signal 111 once again, the message section 114 is allocated to the mobile terminal in a higher priority in case of competition of the requests from a plurality of mobile terminals 103.

As an example, it is supposed that the second mobile terminal 1032 and the third mobile terminal 1033 transmit the preamble signals 111 to the base station 101 with a temporal overlapping, i.e., in a competing state. Also, it is supposed that the base station 101 can allocate the message section 114 only one of the second and third mobile terminals 1032 and 1033. In this case, each of directions θ2 and θ3 are determined from these preamble signals 111. It is determined whether the mobile terminal 103 to which the NACK signal 113 is replied is present in the same direction θ2 or θ3 as the determined direction or in a predetermined direction range in the relatively near past. For example, if only the second mobile terminal 1032 has such a record, it is understood that the second mobile terminal 1032 is set to wait for communication start at least once. In this example, the allocation of the message section 114 is carried out to the second mobile terminal 1032 in a higher priority than the third mobile terminal 1033.

Figure 3:
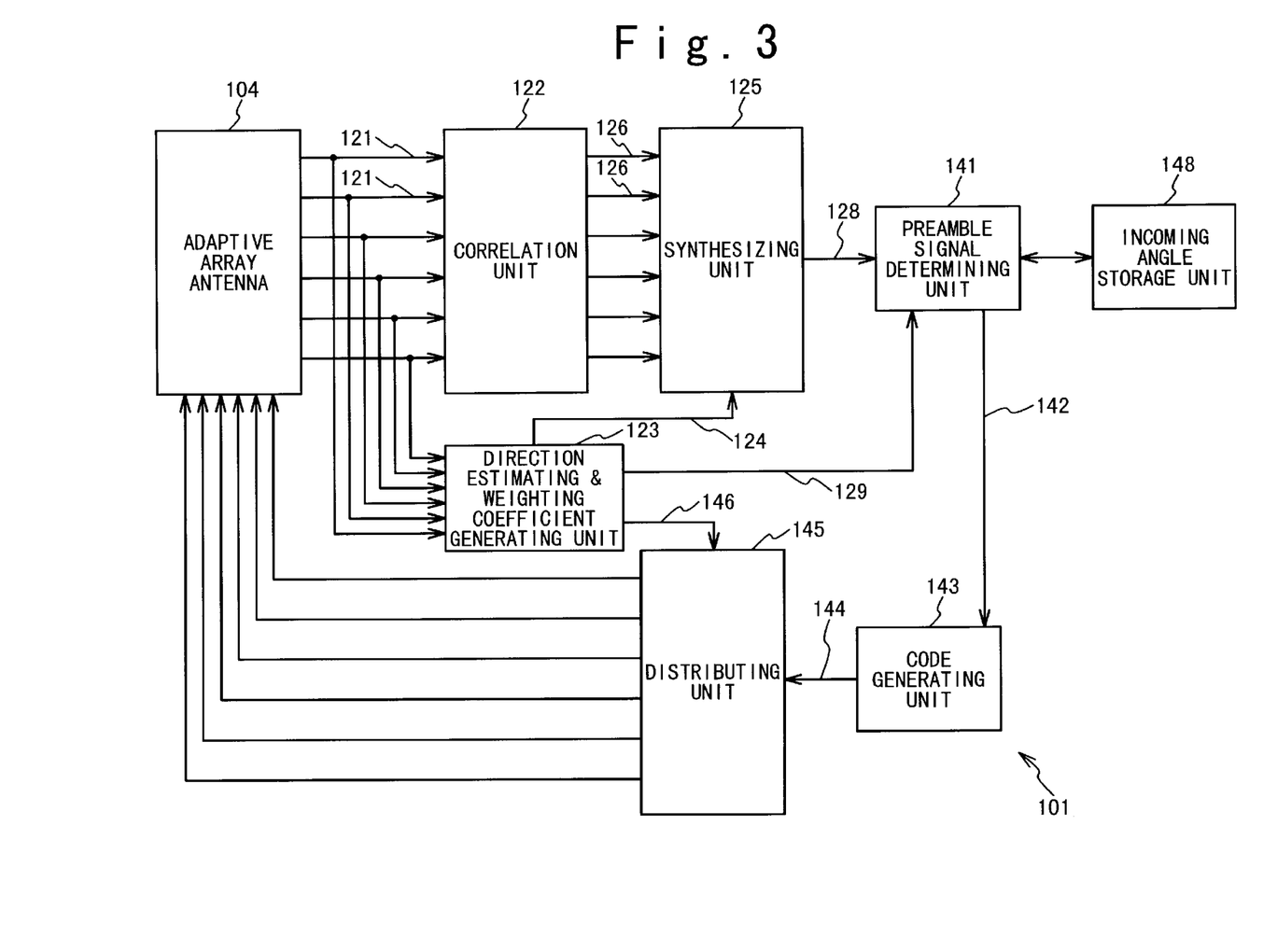
FIG. 3 is a block diagram showing a main section of the structure of the base station in the embodiment of the present invention.

FIG. 3 shows the circuitry structure of a main section of the base station with such a function. The base station 101 supplies a baseband signal 121 obtained from each antenna element of an adaptive array antenna 104 to a correlation unit 122 and a direction estimating and weighting coefficient generating unit 123.

Figure 4:
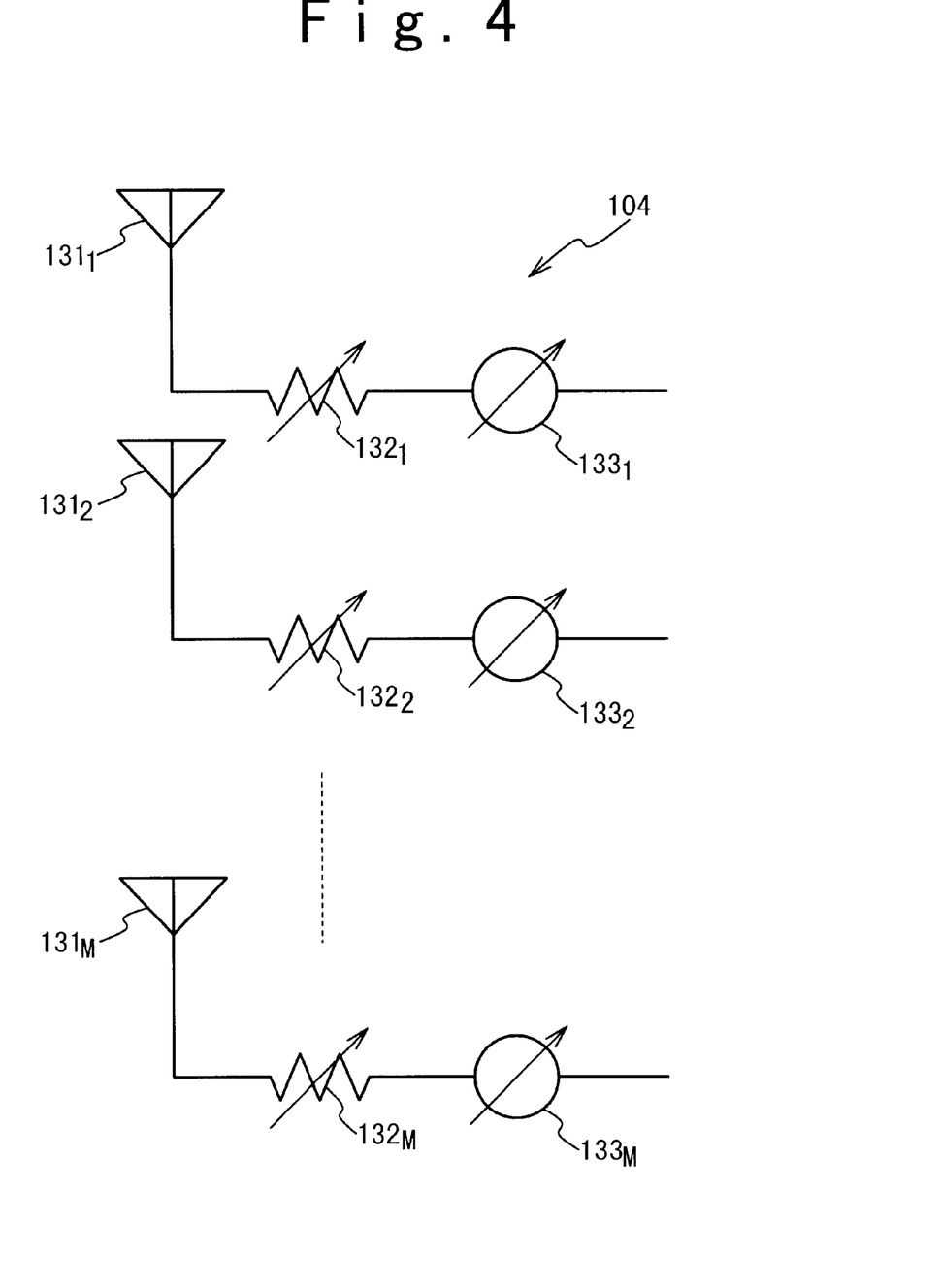
FIG. 4 is a circuit diagram showing the theoretical structure of an adaptive array antenna.

FIG. 4 shows a theoretical structure of the adaptive array antenna. In the adaptive array antenna 104, the signal is received by each of the antenna elements 131 1 to 131 M, attenuated by variable attenuators 132 1 to 132M and shifted by variable phase shifters 133 1 to 133M in phase. Thus, a difference between the times when the electromagnetic waves arrive and the deviations of phase and waveform can be eliminated. Also, the variable attenuators 132 1 to 132M and the variable phase shifters 133 1 to 133M are adjusted so that the directionality can be changed. In this way, the data can be acquired to determine the direction of the mobile terminal 103 which has transmitted the preamble signal 111. The respective reception signals passed through the variable phase shifters 133 1 to 133M are demodulated by demodulators (not shown) and then are supplied to the correlation unit 122 and the direction estimating and weighting coefficient generating unit 123, as a baseband signal 121 as shown in FIG. 3. It should be noted that a receiving apparatus using an adaptive array antenna is disclosed in Japanese Laid Open Patent application (JP-A-Heisei 9-247005), as described above. Also, a directionality control antenna apparatus is disclosed in Japanese Laid Open Patent application (JP-A-Heisei 10-70502) and Japanese Laid Open Patent application (JP-A-Heisei 11-215049), as described above.

Returning to FIG. 3, the correlation unit 122 calculates a correlation value between each of the preamble signals 111 which are predetermined for the mobile terminals 103 and the received signal (baseband signal 121) for each of the antenna elements 131 1 to 131M (FIG. 4) of the adaptive array antennas 104. The direction estimating and weighting coefficient generating unit 123 calculates correlation in parallel to this. In case of the direction estimating and weighting coefficient generating unit 123, the variable attenuators 132 1 to 132M shown in FIG. 4 and the variable phase shifters 133 1 to 133M are adjusted as mentioned above, and the direction from which the preamble signal 111 transmitted from the mobile terminal 103 arrives is determined. Further, weighting coefficients to each of the antenna elements 131 1 to 131M are generated. The weighting coefficients 124 generated in this way are supplied to the synthesizing unit 125 so that the correlation value outputs 126 outputted from the correlation unit 122 for the antenna elements 131 1 to 131M are weighted and synthesized there.

The synthesized correlation value 128 outputted from the synthesizing unit 125 and the incoming angle data 129 outputted from the direction estimating and weighting coefficient generating unit 123 are supplied to the preamble signal determining unit 141. The preamble signal determining unit 141 carries out the determination of the reception of the preamble signal 111. Also, the preamble signal determining unit 141 carries out the determination whether the ACK signal 112 (FIG. 2) should be transmitted to permit communication or the NACK signal 113 (FIG. 2) should be transmitted not to permit the communication, to the received preamble signal 111. The reply signal 142 of the ACK signal or the NACK signal is outputted in accordance with this determination and is supplied to a code generating section 143. The code generating section 143 generates a code sequence 144 which is equivalent to the ACK signal or the NACK signal, in accordance with the content of this reply signal 142 and supplies to a distribution unit 145. The distribution unit 145 supplies the code sequence 144 of the ACK signal or NACK signal to the antenna elements 131 1 to 131M (see FIG. 4) of the adaptive array antenna 104. At this time, the weighting coefficients 146 are multiplied to the signal which is supplied to the antenna elements 131 1 to 131M.

The determining unit 141 stores in the incoming angle storage unit 148, the incoming angle of the preamble signal 111 determined to reply the NACK signal 113 not to permit communication by the preamble signal determining unit 141. The storage unit 148 holds or maintains this for a predetermined time. After being held for a finite time, the determining unit 141 clears the incoming angle,for one mobile terminal stored in the storage unit 148. This is because all the first to N-th mobile terminals 1031 to 103N have the characteristics to move with time. That is, if there is one having the same or similar incoming angle for a relatively short time, the mobile terminal 103 is regarded as same and is given the permission of the communication start in a higher priority. However, in the other case, because the possibility that the other mobile terminal has transmitted the preamble signal is large, the stored incoming angle is deleted after the predetermined time.

In addition, the determining unit 141 stores the angle data for the mobile terminal in the storage unit 148 for the first time and allocate a predetermined priority level. Then, when communication request from the mobile terminal is not permitted again, the determining unit 141 updates the priority level to a higher value.

Figure 5:
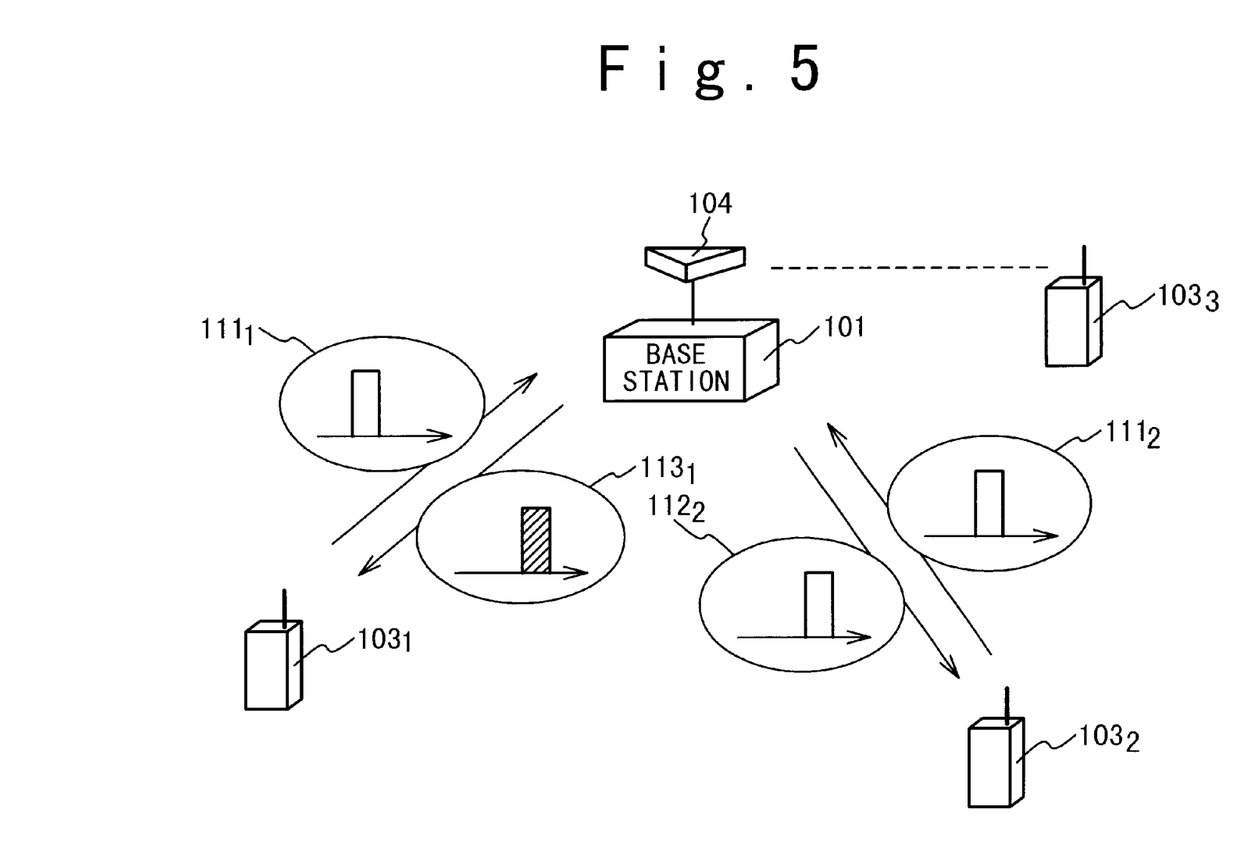
FIG. 5 is a diagram showing a communication state between the base station and the first to third mobile terminals at some time.
Figure 6:
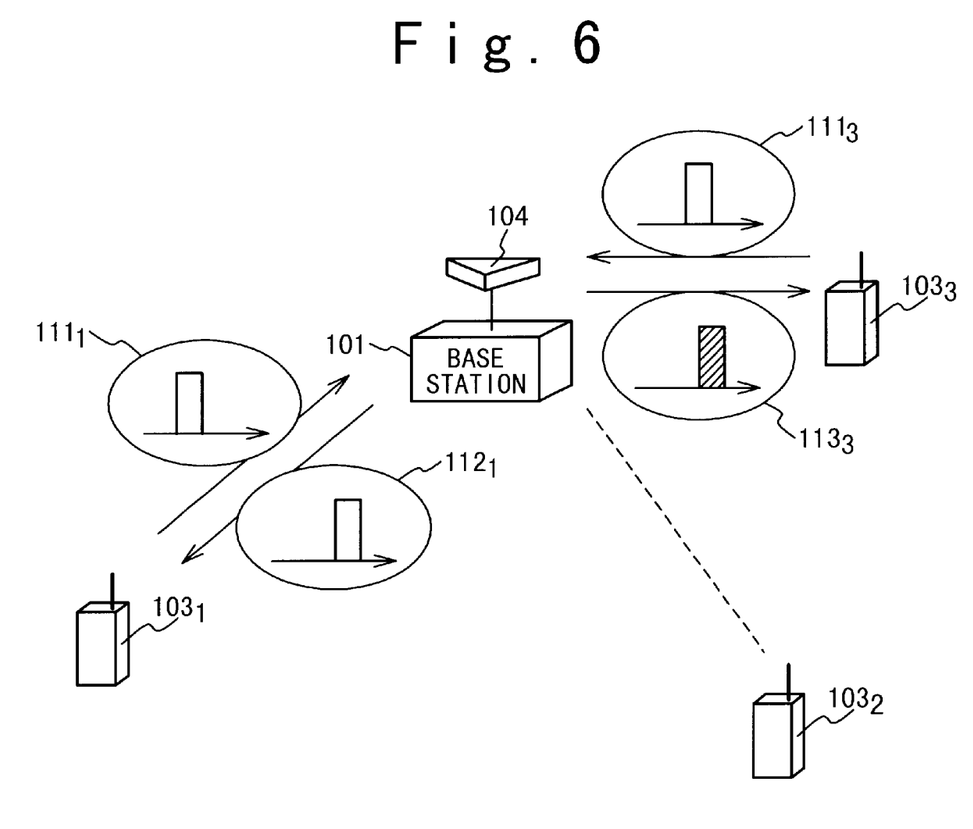
FIG. 6 is a diagram showing a communication state after a relatively short time from the time shown in FIG. 5.

FIG. 5 shows a state of the communication between the base station and the first to third mobile terminal at some time. FIG. 6 shows the similar communication state after a relatively short time from that time. A specific operation of the radio communication permission control system in this embodiment will be described with reference to these figures using an actual example.

First, the communication situation shown in FIG. 5 will be described. Here, the first and second mobile terminals 1031 and 1032 transmit preamble signals 1111 and 1112 to the base station 101 while competing with each other temporally. The base station 101 replies the ACK signal 1122 to the second mobile terminal 1032 to permit communication. However, the base station 101 replies the NACK signal 1131 to the first mobile terminal 1031. Under such a situation shown in this FIG. 5, the third mobile terminal 1033 does not participate the communication at all.

Figure 7:
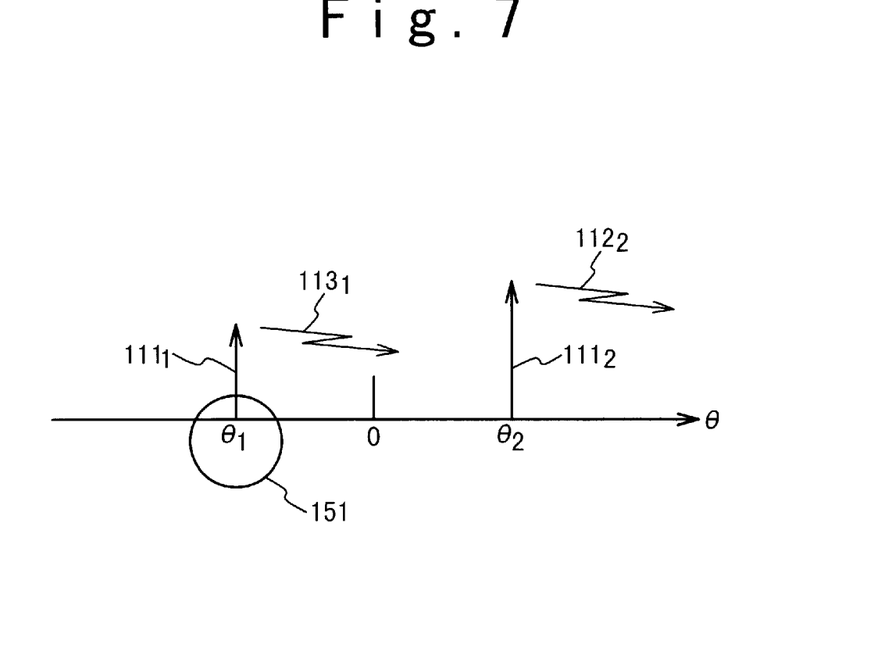
FIG. 7 is a diagram showing a relation between the incoming angle of a preamble signal of each of the second mobile terminal and the first mobile terminal to the base station.

FIG. 7 corresponds to FIG. 5 and shows a relation between the incoming angles of the preamble signal of each of the first and second mobile terminals to the base station. It is supposed that the incoming angle of the preamble signal 1111 transmitted from first mobile terminal 1031 and income to or arrived at the base station 101 is θ1, and the incoming angle of the preamble signal 1112 transmitted from the second the mobile terminal 1032 and arrives at the base station 101 is θ2. At this time, both have the relation as shown in this FIG. 7. The ACK signal 1122 is replied to the preamble signal 1112. The NACK signal 1131 is replied to the preamble signal 1111. Therefore, the incoming angle θ1 is stored in the incoming angle storage unit 148 shown by 151 in FIG. 3.

In the communication situation shown in FIG. 5, the first mobile terminal 1031 cannot communicate. Therefore, the first mobile terminal 1031 transmits the preamble signal 1111 once again to the base station 101 after a predetermined time. This is the communication situation shown in FIG. 6. In the situation shown in FIG. 6, the second mobile terminal 1032 has ended communication. Here, the third mobile terminal 1033 sends out the preamble signal 1113 and competes with the access by the first mobile terminal 1031. The base station 101 primarily replies the ACK signal 1121 to the first mobile terminal 1031 in which the incoming angle θ1 151 is stored as shown in FIG. 7. With this, the first mobile terminal 1031 can start communication. Such priority control processing is not carried out to the third mobile terminal 1033 and the NACK signal 1133 is replied.

Figure 8:
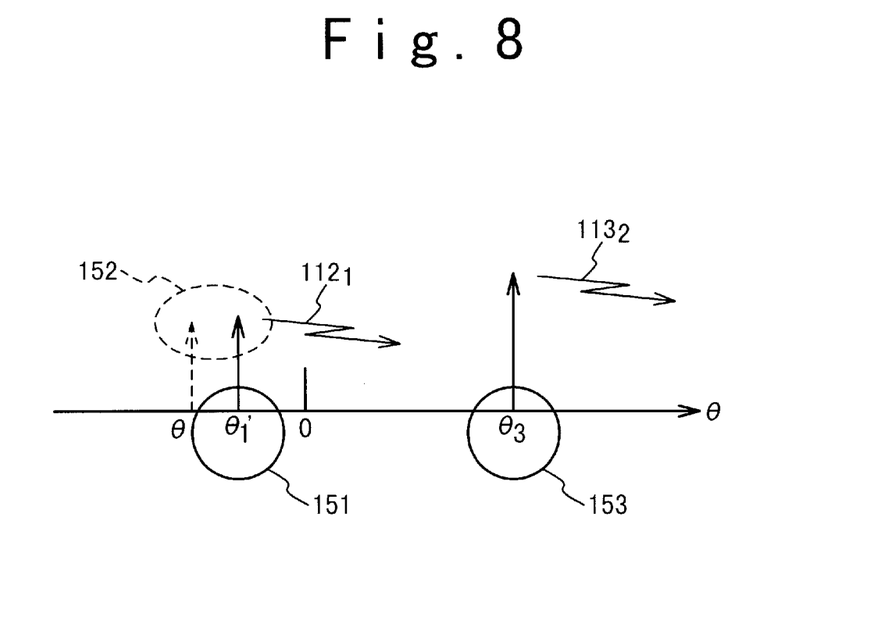
FIG. 8 is a diagram showing a relation between the incoming angle of the preamble signal of each of the second mobile terminal and the first mobile terminal to the base station.

FIG. 8 is a figure corresponding to FIG. 6 and shows a relation between the incoming angle of the preamble signal of each of the first and second mobile terminals to the base station. It is supposed that the incoming angle of the preamble signal 1111 transmitted once again from the first mobile terminal 1031 and arrived at the base station 101 is θ1'. Also, it is supposed that the incoming angle of the preamble signal 1113 transmitted from the third mobile terminal 1033 and arrived at the base station 101 is θ3. Supposing that the time difference between the situation shown in FIG. 5 and the Situation shown in FIG. 6 is small sufficiently, or supposing that the moving speed of the first mobile terminal 1031 is not high, the incoming angle θ1' from the first mobile terminal 1031 is the same as θ1 or the angle difference between the previous incoming angle and the current incoming angle is small sufficiently. Therefore, the base station 101 can determine based on the previous incoming angle θ1 that the preamble signal 1111 with the incoming angle θ1' is concerned with the first mobile terminal 1031 (152). Therefore, the message section 114 (see FIG. 2) can be primarily allocated and the ACK signal 1121 can be replied to the first mobile terminal 1031.

The NACK signal 1133 is replied to the third mobile terminal 1033. Therefore, the base station 101 stores the incoming angle θ3 in the incoming angle storage unit 148 (153). When the third mobile terminal 1033 sends out the preamble signal 1113 once again after a relatively short time, the priority control processing is carried out to this in the same way.

Figure 9:
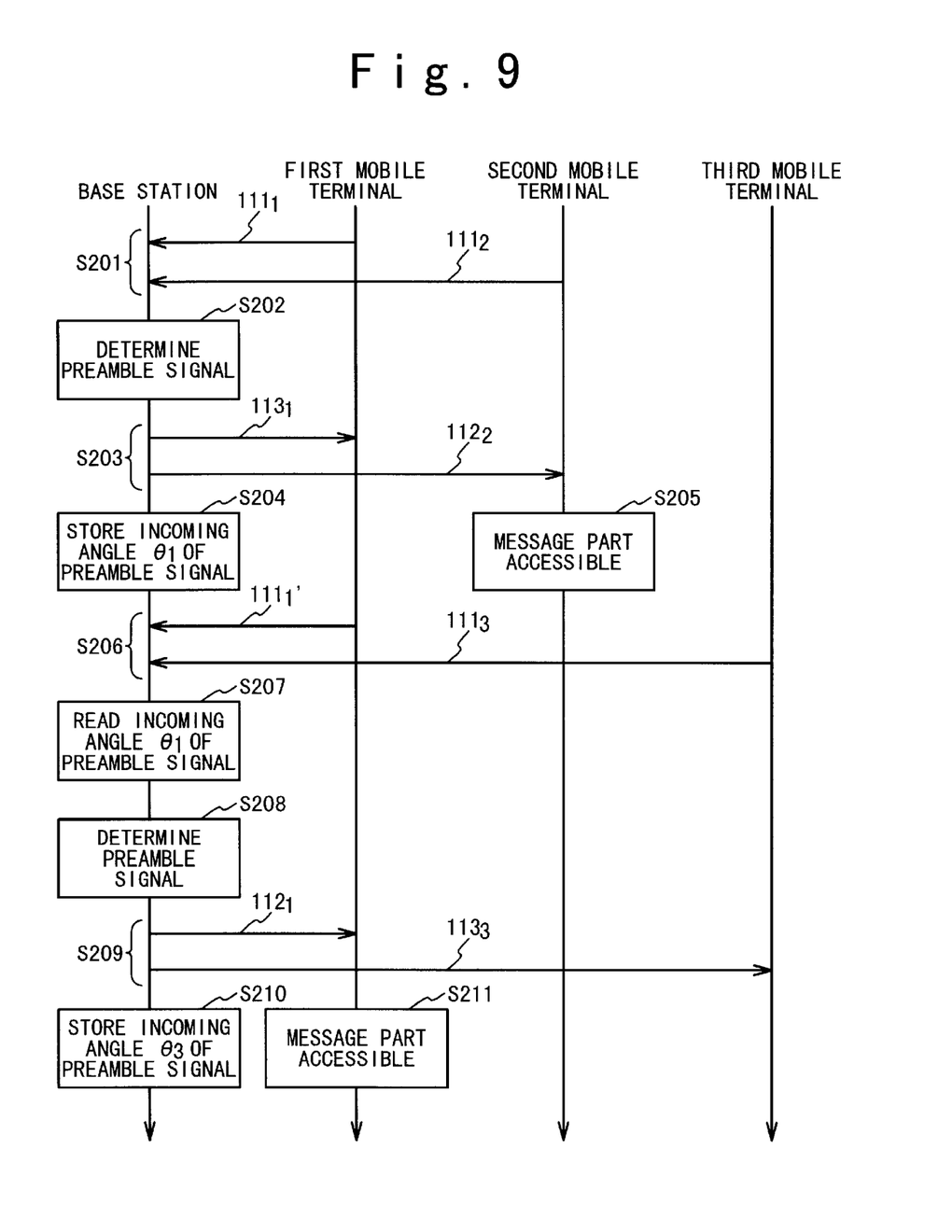
FIG. 9 is a diagram showing a processing flow of the first to third mobile terminals in the embodiment of the present invention.

FIG. 9 shows a flow of the processing of above first to third mobile terminals. Because the detailed description is already made with reference to FIG. 5 to FIG. 8, the base station 101 will be mainly easily described. When the base station 101 receives two competing preamble signals 1111 and 1112 (Step S201), the base station 101 carries out the determination of the preamble signals (Step S202). Then, the base station 101 replies the NACK signal 1131 to the first mobile terminal 1031 in accordance with predetermined logic. On the other hand, the base station 101 replies the ACK signal 1122 to the second mobile terminal 1032 (Step S203). Also, the base station 101 stores the incoming angle θ1 for the preamble signal 1111 to have replied the NACK signal 1131 after this (Step S204). The second mobile terminal 1032 which has received the ACK signal 1122 is set to be possible for the access of the message section to be possible (Step S205).

The first mobile terminal 1031 sends out the preamble signal 1111' once again while the storage of the incoming angle θ1 is still carried out. When this competes with the preamble signal 1113 from the third mobile terminal 1033 (Step S206), the base station 101 reads the incoming angle θ1 (Step S207), and compares the incoming angle θ1' and the incoming angle θ3 (Step S208). As a result, the first mobile terminal 1031 receives the reply of the ACK signal 1121 primarily in the relation of the incoming angles θ1 and θ1'. The NACK signal 1133 is replied to the third mobile terminal 1033 (Step S209). Therefore, the incoming angle θ3 is stored (step S210). Thus, the first mobile terminal 1031 is possible to access using the message section (Step S211).

Figure 10:
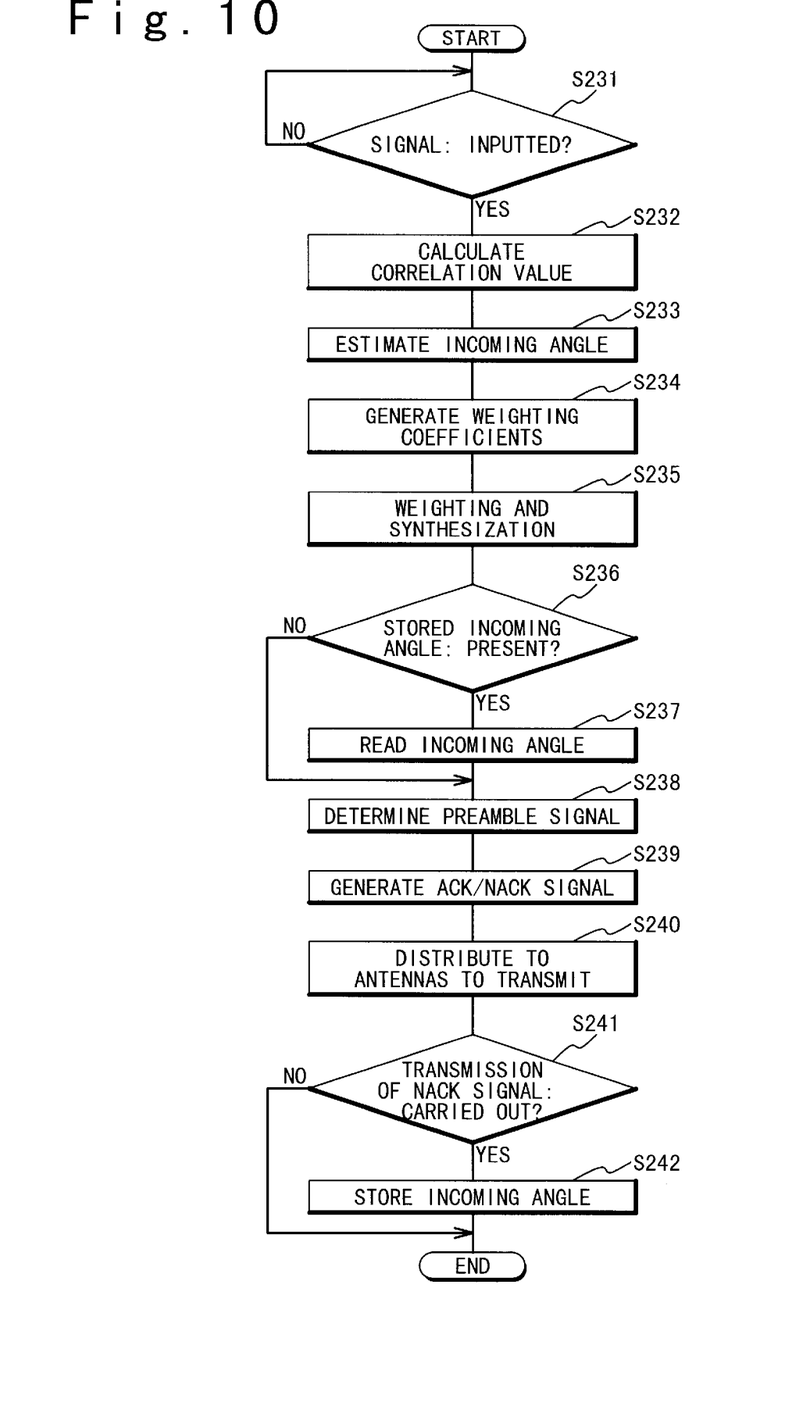
FIG. 10 is a flow chart showing the processing flow of the radio communication permission control system in the embodiment of the present invention.

FIG. 10 shows a processing flow of radio communication permission control system of the base station which carries out above mentioned control. The base station is composed of a CPU (central processing unit: not shown) and executes a program which is stored in a storage medium (not shown) likewise. The above mentioned processing is realized by this. The radio communication permission control system waits for the reception of the signal from either of the mobile terminals 103 (Step S231). When receiving the signal (Y), the radio communication permission control system calculates the correlation value using the correlation unit 122 shown in FIG. 2 (Step S232). The radio communication permission control system estimates the incoming azimuth angle by the direction estimating and weighting coefficient generating unit 123 (Step S233), and the weighting coefficients to each of the antenna elements 1311 to 131M shown in FIG. 3 are generated (Step S234). The synthesizing unit 125 synthesizes the correlation value output 126 outputted from the correlation unit 122 based on this (Step S235).

At this time point, the radio communication permission control system checks whether or not the incoming angle written into incoming angle storage unit 148 of FIG. 2 within a predetermined time exists (Step S236). When the corresponding incoming angle exists (Y), the radio communication permission control system reads the angle (Step S237), and then carries out the determination of the preamble signal using this (Step S238). When the incoming angle written within the predetermined time does not exist (step S236: N), the radio communication permission control system advances tow the processing of step S238 at once.

After the determination of the preamble signal is carried out, the ACK signal 112 or NACK signal 113 is generated in accordance with the determination result (Step S239), and then replies the mobile terminal 103 which is distributed to the adaptive array antenna 104 and the corresponding mobile terminal (Step S240). If the NACK signal 113 is transmitted (step S241: Y) at this time, the corresponding incoming angle θ is stored in the incoming angle storage unit 148 (Step S242). In the other case (step S241: N), the processing ends without such storage processing (end). It should be noted that the incoming angle θ stored in the incoming angle storage unit 148 is written together with the time data. In the other signal processing operation (not shown), this is regularly read and data of the incoming angle θ after a predetermined time or more passed is deleted. When the ACK signal 112 is sent out after the NACK signal 113 is sent out, the data of the incoming angle θ is deleted in the same way.

It should be noted that the direction of the mobile terminal or the incoming angle of the electric wave from each of the mobile terminals is determined using the adaptive array antenna. However, the similar incoming angle or the direction may be determined without using such an antenna. For example, position data is acquired by the mobile terminal using GPS (Global Positioning System) and it may be transmitted together with the preamble signal as a communication request signal. The incoming angle or the direction may be determined from the position data. In this case, it is possible to determine whether the mobile terminal is near and far from the base station, even if the mobile terminals are in an identical direction, resulting in the higher determination of the precision. The position data may be stored and compared. Moreover, the weighting coefficients of the respective antenna elements are stored, and these weighting coefficients may be compared to specify the mobile terminal.

Also, in the embodiment, a relation between the base station and the mobile terminal is described but the present invention is not limited to this. Generally, the present invention is possible to extend to the relation of a plurality of transceiver terminals (communication terminals) and a transceiver which carries out communication with them. Also, the communication device is not limited to a communication device of the CDMA communication system and in the same way the present invention can be applied to the communications system using FDMA (frequency division multiple access) or a TDMA (time division multiple access), for example.

As described above, according to the invention, the communication start request signal is analyzed and the direction determining section for determining the direction of the communication terminal which has carried out the request is prepared. The direction determined by the direction determining section about the communication terminal for which the reply section did not permit communication start is stored. Every time the request receiving section received a communication start request signal, it is determined whether or not the direction of the communication terminal is in a predetermined angle range stored in the direction storing section. The communication start permission rate to the communication terminal determined to be in predetermined angle range from the direction stored in the direction storing section is more increased than the other communication terminals. Thus, the communication terminal which is not permitted to communicate in the past can be primarily given the opportunity to communicate. Moreover, it is not necessary to confirm the ID of each communication terminal. Also, a case is assumed in which for example, an emergency occurs in a specific narrow region such as the rail yard and a large number of persons request the communication to notify this. In this case, in case where time period is long from the time when a person first demands communication to the time when the person demands communication once again next, if another person demands communication for the time period, the priority processing is carried out to this person. Therefore, there is effect such as the processing when the plurality of persons demand the notice of the emergency in the narrow range is carried out without the delay.

Also, according to the invention, the communication start request signal is analyzed and the incoming angle determining section for determining the incoming angle of the signal which is transmitted from the communication terminal which has carried out the request is provided. The incoming angle determined by the incoming angle determining section about the communication terminal for which the reply section did not permit communication start is stored. When the communication start is required once again from the incoming angle possible to assume that the incoming angle is identical, this is primarily processed. Thus, the opportunity to communicate can be primarily given to the communication terminal which is not permitted to communicate in the past. Moreover, it is not necessary to confirm the ID of each communication terminal. Also, a case is assumed in which for example, an emergency occurs in a specific narrow region such as the rail yard and a large number of persons request the communication to notify this. In this case, in case where time period is long from the time when a person first demands communication to the time when a person demands communication once again next, if another person demands communication for the time period, the priority processing is carried out to this person. Therefore, there is effect such as the processing when the plurality of persons demand the notice of the emergency in the narrow range is carried out without the delay.

Further, according to the invention, the communication start request signal is analyzed and the incoming angle determining section for determining the incoming angle of the signal which is transmitted from the communication terminal which has carried out the request is provided. The incoming angle determined by the incoming angle determining section about the communication terminal for which the reply section did not permit communication start is stored. When the communication start is required once again from the incoming angle which is possible to assume that the incoming angle is identical when the requests of the communication start compete, this is primarily processed. One with the more number of times is primarily processed when the communication terminals not permitted to communicate and being primarily processed are plural, compatible to make process. In this way, because the priority sect ion is provided, the inequality when failing in the access can be eliminated. Moreover, it is not necessary to confirm the ID of each communication terminal.

Also, according to the present invention, the position data storing section is provided to store the position data about the communication terminal for which the reply section did not permit communication start. Then, when the communication start request signals which are sent from a plurality of communication terminals competes and when the communication can not be permitted to these all communication terminals, it is determined whether the position data transmitted from the communication terminals which compete is in the predetermined position range for the position of the communication terminal that are stored in the position data storing section. The communication terminal determined to be in predetermined position range is primarily processed by the priority section. In this way, because the priority section is provided, the inequality when failing in the access can be eliminated. Moreover, it is not necessary to confirm the ID of each communication terminal.

Further, according to the present invention, the incoming angle stored in the incoming angle storing section is held only for the predetermined time which is possible to assume that the communication terminal does not largely move. By making it not be possible to use after this, it is prevented that the other communication terminal which moved from the different direction is primarily processed.

Also, according to the present invention, the position data stored in the position data storing section is held only for the predetermined time which is possible to assume that the communication terminal does not largely move. By making it not be possible to use after this, it is prevented that the other communication terminal which moved from the different direction is primarily processed.

What is claimed is:

1. A radio communication permission control apparatus comprising:
   a request receiving section which receives communication start request signals from requesting communication terminals;
   a reply section which replies to each of said requesting communication terminal based on priority levels of said requesting communication terminals, a response indicating whether or not to permit communication start every time said request receiving section receives each of said communication start request signals;
   an estimating section which analyzes said communication start request signal and estimates a position relation with said requesting communication terminal to generate position relation data;
   a storage section which stores said position relation data;
   a determining section which determines whether or not said position relation data of each of said requesting communication terminals to which the communication start are not permitted as prohibited communication terminals falls within a range which is predetermined based on each of said position relation data stored in said storage section, and stores the position relation data in said storage section; and
   a priority section which increases said priority levels for said prohibited communication terminals.

2. The radio communication permission control apparatus according to claim 1, wherein said position relation data indicates a direction of each of said requesting communication terminals from said radio communication permission control apparatus.

3. The radio communication permission control apparatus according to claim 2, wherein said determining section determines whether or not a direction of said requesting communication terminal indicated by said estimated position relation data is in a predetermined directional range corresponding to any of said position relation data stored in said storage section.

4. The radio communication permission control apparatus according to claim 1, wherein said position relation data indicates an incoming angle of said communication start request signal transmitted from each of said requesting communication terminals to said radio communication permission control apparatus.

5. The radio communication permission control apparatus according to claim 4, wherein said determining section determines whether or not an incoming angle of said communication start request signal from said requesting communication terminal indicated by said estimated position relation data is in a predetermined angle range corresponding to any of said position relation data stored in said storage section.

6. The radio communication permission control apparatus according to claim 1, wherein each of said requesting communication terminals transmits position data of said requesting communication terminal together with said communication start request signal,
   said estimating section extracts said position data as said position relation data, and
   said position relation data is said position data indicating a position of each of said requesting communication terminals.

7. The radio communication permission control apparatus according to claim 6, wherein said determining section determines whether or not a position of said requesting communication terminal falls within a predetermined position range corresponding to any of said position relation data stored in said storage section.

8. The radio communication permission control apparatus according to claim 1, wherein said position relation data is held in said storage section for a predetermined time period.

9. The radio communication permission control apparatus according to claim 8, wherein said predetermined time period is a time period during which said requesting communication terminal is regarded not to move farther than a predetermined distance.

10. The radio communication permission control apparatus according to claim 1, wherein when the communication start is permitted to said requesting communication terminal as a permitted communication terminal, said determining section deletes said position relation data corresponding to said permitted communication terminal from said storage section.

11. A method of permitting communication in a radio communication permission control apparatus comprising the steps of:
    (a) receiving communication start request signals from requesting communication terminals;
    (b) replying to each of said requesting communication terminal based on priority levels of said requesting communication terminals, a response indicating whether or not to permit communication start every time the reception of each of said communication start request signals;
    (c) analyzing said communication start request signal and estimating a position relation with said requesting communication terminal to generate position relation data;
    (d) determining whether on not said position relation data of each of said requesting communication terminals to which the communication start are not permitted as prohibited communication terminals falls within a range which is predetermined based on each of said position relation data stored in said storage section, and stores the position relation data in a storage section; and
    (e) increases said priority levels for said prohibited communication terminals.

12. The method according to claim 11, wherein said position relation data indicates a direction of each of said requesting communication terminals from said radio communication permission control apparatus.

13. The method according to claim 12, wherein said (d) determining step comprises the step of:
    determining whether or not a direction of said requesting communication terminal indicated by said estimated position relation data is in a predetermined directional range corresponding to any of said position relation data stored in said storage section.

14. The method according to claim 11, wherein said position relation data indicates an incoming angle of said communication start request signal transmitted from each of said requesting communication terminals to said radio communication permission control apparatus.

15. The method according to claim 14, wherein said (d) determining step comprises the step of:
    determining whether or not an incoming angle of said communication start request signal from said requesting communication terminal indicated by said estimated position relation data is in a predetermined angle range corresponding to any of said position relation data stored in said storage section.

16. The method according to claim 11, wherein each of said requesting communication terminals transmits position data of said requesting communication terminal together with said communication start request signal, said (c) estimating step comprises the step of:
extracting said position data as said position relation data, and
said position relation data is said position data indicating a position of each of said requesting communication terminals.

17. The method according to claim 16, wherein said (d) determining step comprises the step of:
determining whether or not a position of said requesting communication terminal falls within a predetermined position range corresponding to any of said position relation data stored in said storage section.

18. The method according to claim 11, wherein said position relation data is held in said storage section for a predetermined time period.

19. The method according to claim 18, wherein said predetermined time period is a time period during which said requesting communication terminal is regarded not to move farther than a predetermined distance.

20. The method according to claim 11, wherein when the communication start is permitted to said requesting communication terminal as a permitted communication terminal, said (d) determining step comprises the step of:
deleting said position relation data corresponding to said permitted communication terminal from said storage section.

* * * * *